W. L. BLISS.
LIGHTING SYSTEM.
APPLICATION FILED JAN. 6, 1905.

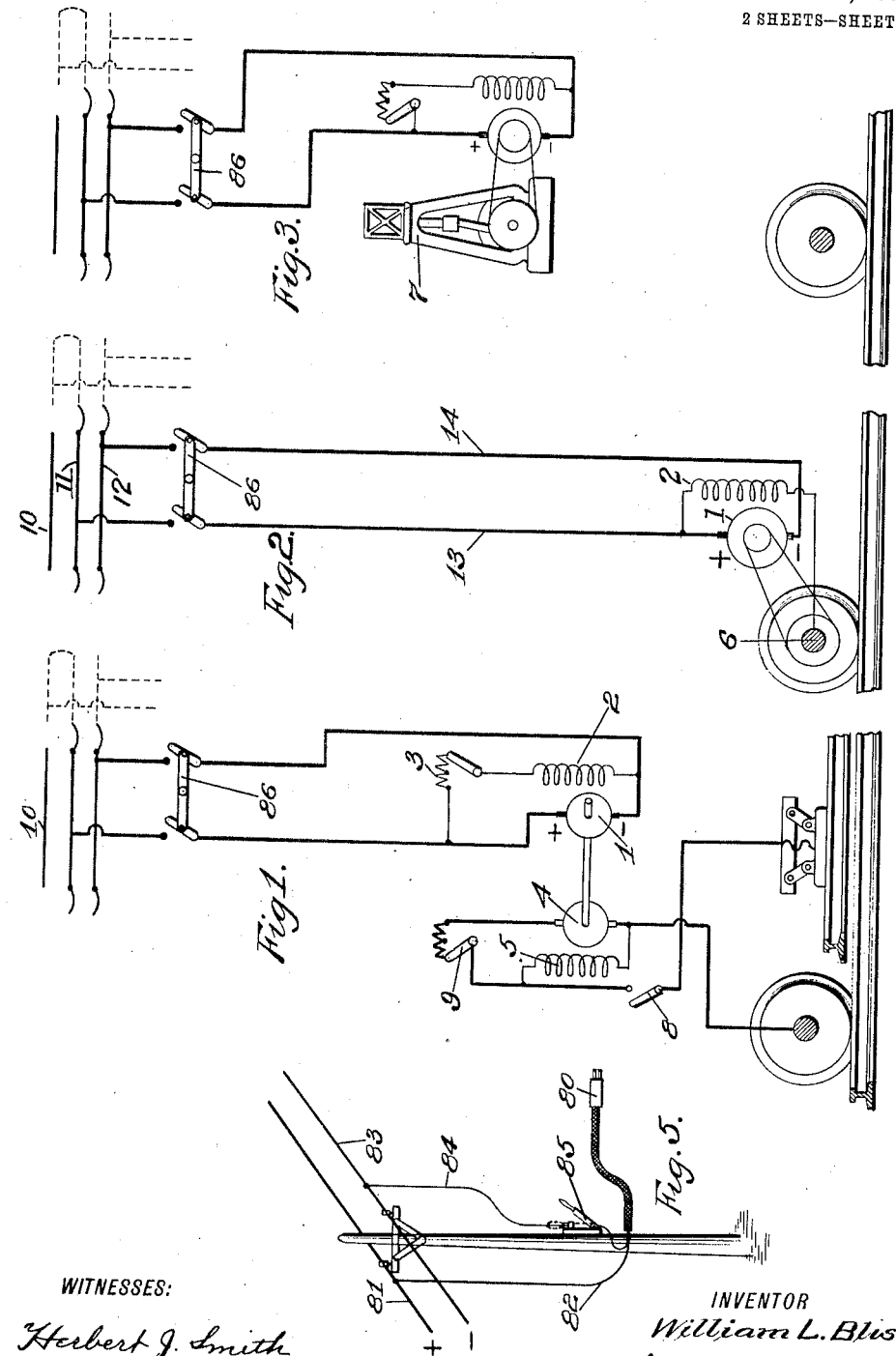

946,715.

Patented Jan. 18, 1910.

2 SHEETS—SHEET 2.

WITNESSES:
Herbert J. Smith
Edwin B. H. Tower, Jr.

INVENTOR
William L. Bliss
BY
Jones & Addington
ATTORNEYS

UNITED STATES PATENT OFFICE.

WILLIAM L. BLISS, OF BROOKLYN, NEW YORK.

LIGHTING SYSTEM.

946,715.

Specification of Letters Patent. Patented Jan. 18, 1910.

Application filed January 6, 1905. Serial No. 239,925.

*To all whom it may concern:*

Be it known that I, WILLIAM L. BLISS, a citizen of the United States, residing at Brooklyn, in the county of Kings and State of New York, have invented new and useful Improvements in Lighting Systems, of which the following is a full, clear, concise, and exact description, reference being had to the accompanying drawing, forming a part of this specification.

The present invention relates to lighting systems which are adapted to be employed for lighting cars or trains by electricity.

The systems which may be employed for lighting cars or trains by electricity usually employ a generator and a storage battery to furnish the current for operating the lamps, the storage battery being provided to furnish the current for operating the lamps while the generator is inoperative. It has been the practice in many instances to provide every necessary element of a complete lighting system upon each car which is to be lighted, thereby isolating the system and making the car an independent unit in respect to the lighting thereof. It is possible, however, to employ a train lighting system to light several or all of the cars or units in the train, the generator being arranged upon one of the train units and connected to the lamps arranged upon other train units by a train line. It sometimes occurs that a car equipped with an isolated car lighting system is arranged in a train equipped with a train lighting system. It would be advantageous under such conditions to make the isolated car lighting system a part of the train lighting system. The present invention has for the object thereof to provide means by which an isolated car lighting system may be made a part of a train lighting system.

It will be understood that the train lighting system and the isolated car lighting system may be of various types, and that the means for making the isolated car lighting system a part of the train lighting system may be of various forms and employed in different ways.
The present invention shall be explained by the systems which are diagrammatically illustrated in the accompanying drawings, the views in said drawings being as follows:

Figure 1 is a diagrammatic view of the generator of a train lighting system driven by an electric motor. Fig. 2 is a diagrammatic view of said generator driven by a car axle. Fig. 3 is a diagrammatic view of said generator driven by an engine. Fig. 4 is a diagrammatic view of two cars, one of said cars being provided with an isolated car lighting system and the other with a part of a train lighting system, and Fig. 5 is a diagrammatic view of a stationary source of electrical energy.

The generator of the train lighting system is illustrated in Figs. 1, 2 and 3, it being provided with an armature 1 and a field 2. The field circuit of the generator may be provided with a resistance 3, as illustrated in Figs. 1 and 3. The Figs. 1, 2 and 3 of the drawings illustrate different ways of driving the generator. In Fig. 1 it is driven by an electric motor having an armature 4 and a field 5; in Fig. 2, it is driven by an axle 6, and in Fig. 3 it is driven by an engine 7. The electric motor illustrated in Fig. 1 may be connected to any suitable source of electrical energy, it being illustrated as connected to the track and the third rail of an electric traction system. The starting device 9 is preferably provided for starting the motor, and the switch 8 is preferably employed for controlling the motor circuit.

The several ways of driving the motor which have been illustrated in the drawings have been selected merely for the purpose of disclosing the invention. It will be understood that the generator may be driven in other ways.

The cars of the train which are to be lighted are illustrated in Fig. 4. Where the generator is driven by an axle, as illustrated in Fig. 2, an automatic regulator may be provided to confine the output thereof within safe limits. It will be assumed in setting forth the present invention that the generator of the train lighting system is driven by an axle, as illustrated in Fig. 2, so that a way of regulating the generator as the speed of the train varies may be explained. It will be sufficient for the purpose of explaining the invention to consider two cars, A and B, the car A being equipped with an isolated car lighting system, and the car B being equipped with a part of a train lighting system. It will be understood that the train may be composed of any number of cars and that there may be one or more cars in the train, each of which is equipped with an isolated car lighting system. Through the cars of the train extends a train line or circuit, a section of said line being arranged upon each car and suitably connected to the section of the line arranged upon an adjacent car. The train line may be composed of conductors 10, 11 and 12, the conductors 11 and 12 being connected to the generator by conductors or mains 13 and 14, and the conductor 11 being connected to the conductor 10 by the jumper 15.

The isolated lighting system arranged upon the car A shall now be explained. The generator preferably having an armature 16 and a shunt field 17 may be driven by an axle 18, the same being connected to said axle in any suitable way. The storage battery 19 and the lamps 20 may be connected to the generator or to the train line by means of a changeover switch which is preferably provided with switch blades 22, 23 and 24, pivoted upon central terminals 25, 26 and 27 respectively. The outer ends of the switch blades are adapted to engage upper terminals 28, 29 and 30 when the same are in the upper position thereof, and to engage lower terminals 31 and 32 when the same are in the lower position thereof. While the isolated lighting system is being described, it will be assumed that the switch blades of the changeover switch are in the lower position thereof, as indicated in dotted lines. The storage battery 19 and the lamps 20 are connected to the conductors or mains 33 and 34 of a supply circuit, the conductor 34 preferably being connected directly to a terminal of the generator.

The circuit between the generator and the storage battery may be controlled by an automatic electric switch having stationary contacts 35 and 36 and a movable contact 37. The movable contact may be carried by a plunger 38, and it is adapted to engage the stationary contacts 35 and 36. The plunger 38 may be actuated by a winding 39 of fine wire and a winding 40 of coarse wire. The winding 40 may have one end thereof connected to the stationary contact 35, the other terminal thereof being connected to the central terminal 25 of the changeover switch by a conductor 41. The contact 36 may be connected to the conductor 33. The winding 39 may be connected between the conductor 41 and a conductor 42, the latter conductor being connected between the conductor 34 and the central terminal 26 of the changeover switch.

The generator may be regulated by a dynamo-electric regulator having an armature 43 and a field 44, said armature being adapted to introduce a counter electromotive force into the circuit of the field 17 of the generator. The field 44 of the dynamo-electric regulator may be arranged in the battery circuit in series with the storage battery. The voltage which the generator impresses upon the translating devices may be regulated by a dynamo-electric regulator having an armature 45 arranged in the translating circuit to introduce a counter electromotive force therein, said regulator preferably being provided with the same field as the regulator for the generator. The dynamo-electric regulators may be set in operation by an electric motor having an armature 46 and a field 47.

The field 17 of the generator may have one terminal thereof connected to the conductor 41 by a conductor 48 and the other terminal thereof connected to the lower terminal 32 of the changeover switch by a conductor 49. The armature 43 of the dynamo-electric regulator for the generator may have one terminal thereof connected to the central terminal 27 of the changeover switch by the conductor 50, and the other terminal thereof connected to the main 34. The armature 46 and the field 47 of the regulator motor may each have one terminal thereof connected to the conductor 48 by a conductor 51 and the other terminal thereof connected to the main or conductor 34.

It will now be assumed that the generator is in operation and the automatic electric switch is closed. The current delivered by the generator may then flow from the positive terminal thereof through conductor 52, terminal 31, switch blade 22, terminal 25, conductor 41, winding 40, switch contacts 35, 37, 36, conductor 33, thence dividingly through storage battery 19 and translating devices 20 and finally through conductor 34 to the negative terminal of the generator. The energizing current for the field 17 of the generator may flow from the conductor 41 through conductor 48, field 17, conductor 49, terminal 32, switch blade 34, terminal 27, conductor 50 and regulator armature 43 to the conductor 34. The motor current may flow from the conductor 41, through conductors 48 and 51, armature 46 and field 47 to the conductor 34.

When the voltage of the generator tends to increase upon an increase in the speed of the train, the current flowing through the battery circuit will increase. As the strength of the field or controlling magnet 44 will be increased thereby, the counter electromotive force introduced into the field circuit of the generator will be increased and consequently the strength of the field of the generator will be decreased. The dynamo-electric regulator will thus regulate the generator to confine the output thereof within safe limits, notwithstanding the excessive variations in speed to which the generator will be subjected. The counter electromotive force introduced into the translating circuit by the armature 45 will vary as the strength of the field 44 varies, and in consequence, substantially constant voltage will be maintained upon the translating devices.

The automatic switch will be closed by the winding 39 when the voltage of the generator is substantially equal to that of the battery, the energizing current of said winding flowing from the conductor 41 through winding 39, and thence through conductor 42 to conductor 34. While the generator sends current across the switch, the winding 40 will assist the winding 39 in keeping the switch closed. Whenever the voltage developed by the generator becomes less than that of the battery, current will flow backward through the winding 40 from the battery, and consequently said winding will oppose the action of the winding 39, thereby causing the switch to open.

The portion of the train lighting system arranged upon car B shall now be explained. The local car mains 53 and 54 are connected to the conductors 10 and 12 of the train line. The storage battery 55 and translating devices 56 are connected in parallel with each other between the conductors 57 and 58 of a supply circuit, the conductor 58 being connected directly to the conductor 54. The circuit of the translating devices may be controlled by an automatic switch provided with stationary contacts 60 and 61, and a movable contact 62. The plunger 63 which carries the movable contact 62 is preferably actuated by windings 64 and 65, the winding 64 preferably being connected across the local mains 53 and 54, and the winding 65 preferably being connected in series with the switch contacts. The automatic switch operates in the same way as the automatic switch which is arranged upon the other car.

The generator of the train lighting system may be regulated by a dynamo-electric regulator arranged upon car B and having an armature 66 and a field 67, said armature being arranged in the field circuit of the generator to introduce a counter electromotive force therein, and said field 67 being arranged in the battery circuit in series with the storage battery 55. The wheels and track or any other conductor may be employed to connect the armature 66 of the regulator and the field 2 of the generator. The regulator may be set in operation by an electric motor having an armature 68 and a field 69, said motor preferably being arranged between the local main 53 and the supply main 58. When the voltage developed by the generator of the train lighting system increases, the current flowing through the field winding 67 to the storage battery 55 will increase. The field strength of the regulator being increased thereby, the counter electromotive force introduced into the field circuit of the generator will be increased, and in consequence the field strength of the generator will be decreased to confine the output of the generator within safe limits.

The voltage which the generator impresses upon the translating devices 56 may be regulated by a dynamo-electric regulator, the armature 70 of said regulator being arranged in the translating circuit in series with the translating devices 56 to introduce a counter electromotive force therein. The field of said regulator is preferably the same as the field of the generator regulator. When the current traversing the field 67 varies, the counter electromotive force introduced into the circuit of the translating devices will be varied, and consequently substantially constant voltage will be maintained upon the translating devices.

The current delivered by the generator of the train lighting system may flow from the positive terminal thereof through conductors 13 and 11, jumper 15, conductor 10, conductor 53, winding 65, switch contacts 60, 62 and 61, conductor 57, thence dividingly through storage battery 55 and translating devices 56, and finally through conductors 58, 54, 12 and 14, to the negative terminal thereof.

The way in which the isolated car lighting system in car A may be made a part of the train lighting system shall now be explained. The upper terminal 28 of the changeover switch may be connected to the conductor 10 by a conductor 71, and the upper terminal 29 thereof may be connected to the conductor 12 by a conductor 72. The terminal 30 of the changeover switch may be connected to the wheel by a conductor 73. When the switch blades of the changeover switch are in the upper position thereof, the conductor 41 will be disconnected from the conductor 52 and connected to the conductor 71, the conductor 42 will be connected to the conductor 72, and the conductor 50 will be connected to the conductor 73. The storage battery and the translating devices of the isolated car lighting system will be disconnected from the generator of said system and connected to the generator of the train lighting system. The generator of the train lighting system may send current from the positive terminal thereof through conductors 13 and 11, jumper 15, conductor 10, conductor 71, terminal 28, switch blade 22, terminal 25, conductor 41, winding 40, switch contacts 35, 37, 36, conductor 33, thence dividingly through translating devices 20 and storage battery 19 and finally through the conductors 34 and 42, terminal 26, switch blade 23, terminal 29 and conductors 72, 12 and 14 to the negative terminal thereof. The armature 43 of the regulator of the isolated car lighting system being connected to the wheel through conductor 50, terminal 27, switch blade 24, terminal 30 and conductor 73, it will regulate the generator of the train lighting system in the same way as the regulator arranged upon the other car. The regulator upon car A and the regulator upon car B being arranged in parallel with each other, the same will regulate the generator of the train lighting system without interfering with each other in the same manner as the regulators which are set forth in a patent No. 799,516 issued to me Sept. 12, 1905.

When it is necessary to charge the storage batteries while the cars are at rest, the batteries may be connected to a stationary source of electrical energy such as is illustrated in Fig. 5 of the drawings. The car A may be provided with a charging receptacle 74 which is connected to the terminal 28 by a conductor 75 and to the conductor 42 by a conductor 76. The car B may be provided with a charging receptacle 77 which is connected to the conductor 53 by a conductor 78 and to the conductor 54 by a conductor 79. The charging receptacles are adapted to receive a charging plug 80 which may be connected to the electric line illustrated in Fig. 5. The conductor 81 of the electric line may be connected to the charging plug by a conductor 82 and the conductor 83 thereof may be connected to one terminal of a switch 85 by a conductor 84, the other terminal of said switch being connected to said plug.

When the batteries are to be charged, the generator of the train lighting system may be disconnected from the train line by a switch 86. If the plug 80 be inserted in the socket 74, current may flow from the conductor 81 through conductor 82, plug 80, receptacle 74, conductor 75, terminal 28, switch blade 22, terminal 25, conductor 41, winding 40, switch contacts 35, 37, 36, conductor 33, storage battery 19, field 44, conductors 34, 42 and 76, receptacle 74, plug 80, switch 85 and conductor 84 to line 83. If the plug 80 be inserted in the socket 77, current may flow from the conductor 81 through conductor 82, plug 80, receptacle 77, conductor 78, winding 65, switch contacts 60, 62 and 61, conductor 57, storage battery 55, field 67, conductors 58, 54 and 79, receptacle 77, plug 80, switch 85 and conductor 84 to the line 83.

It will be understood from the system which has been set forth that if a car which is provided with a complete isolated lighting system such as is illustrated in car A be arranged in a train which is provided with a train lighting system, the isolated car lighting system may be made a part of the train lighting system.

The means for making the isolated car lighting system a part of the train lighting system may be of various forms, so far as the generic features of the invention are concerned.

It will be understood that the invention as defined by the claims of this application may be applied to various forms of isolated car lighting systems and train lighting systems.

Having thus described my invention, what I claim as new and desire to secure by Letters Patent is:

1. In a car lighting system, in combination, a generator, an automatic regulator for said generator, a storage battery, translating devices, an automatic switch adapted to connect said storage battery and said translating devices to said generator, all combined into a system and arranged upon a car or single train unit and a switch, by means of which said storage battery, said translating devices and said automatic switch may be removed from operative relation with said generator and connected in operative relation with a generator arranged upon another train unit.

2. In a car lighting system, in combination, a generator, an automatic regulator therefor, a storage battery, translating devices, an automatic switch adapted to connect said storage battery and translating devices to said generator, all combined into an operative system arranged upon a car or single train unit and a changeover switch, by means of which said automatic switch, said regulator, said storage battery and said translating devices may be removed from operative relation with said generator and connected in operative relation with a generator upon another train unit in such manner that said regulator and said automatic switch shall perform the same functions in relation to the last mentioned generator as the same did in relation to the first mentioned generator.

3. In a car lighting system, in combination, a generator, an automatic regulator for said generator, a storage battery, translating devices, an automatic switch adapted to connect said storage battery and said translating devices in operative relation to said generator, all combined into an operative system and arranged upon a car or single train unit, electric connections arranged upon said car and arranged to be connected to a generator arranged upon another train unit and a changeover switch adapted to remove said automatic switch, said storage battery and said translating devices from operative relation with the first mentioned generator and connect the same to said electric connections in such manner as to arrange the same in operative relation to the last mentioned generator.

4. In a car lighting system, in combination, a generator, an automatic regulator therefor, a storage battery, translating devices, an automatic switch adapted to operatively connect said storage battery and said translating devices to said generator, all combined into an operative lighting system arranged upon a car or single train unit, electric connections arranged upon said train unit and adapted to be connected to a generator upon another train unit, and a changeover switch adapted to remove said automatic switch, said automatic regulator, said storage battery and said translating devices from operative relation with said first mentioned generator and connect the same to said electric connections in such manner that said automatic switch and said automatic regulator may perform the same functions in relation to the last mentioned generator as the same did in relation to said first mentioned generator.

5. In a lighting system adapted for lighting cars, in combination a generator, a storage battery, translating devices, means for regulating the voltage impressed upon said translating devices, means including a switch arranged between said generator and said storage battery for connecting said storage battery to a stationary source of electrical energy independent of said generator, and an automatic switch adapted to disconnect said storage battery from said stationary source of electrical energy whenever the voltage of said source of electrical energy becomes less than that of said storage battery.

6. In a car lighting system, a generator, a storage battery, translating devices, a dynamo electric regulator adapted to create a counter-electro motive force in the circuit of said translating devices to regulate the voltage impressed thereon, means including a changeover switch arranged between said storage battery and said generator for connecting said storage battery to a stationary source of electrical energy independent of said generator, and an automatic switch adapted to disconnect storage battery from said source of electrical energy whenever the voltage of said source of electrical energy becomes less than that of said storage battery.

In witness whereof, I have hereunto subscribed my name in the presence of two witnesses.

WILLIAM L. BLISS.

Witnesses:
J. W. ROBERTSON,
HERBERT J. SMITH.